March 3, 1936. C. A. KIRWIN 2,032,420

DOUGH FORMER

Filed June 26, 1933

INVENTOR
CHARLES A. KIRWIN
BY
ATTORNEY

Patented Mar. 3, 1936

2,032,420

UNITED STATES PATENT OFFICE 2,032,420

DOUGH FORMER

Charles A. Kirwin, Crystal Lake, Ill., assignor to Walter D. Pierson, Crystal Lake, Ill.

Application June 26, 1933, Serial No. 677,586

4 Claims. (Cl. 107—14)

This invention relates to dough formers and cutters whereby the dough may be formed and delivered directly to the cooking receptacle and has for its object a structure capable of being manually supported and operated.

With the above and other objects in view, as will be apparent, this invention consists in the construction, combination and arrangement of parts, all as hereinafter more fully described, claimed and illustrated in the accompanying drawing, wherein:—

Figure 1:
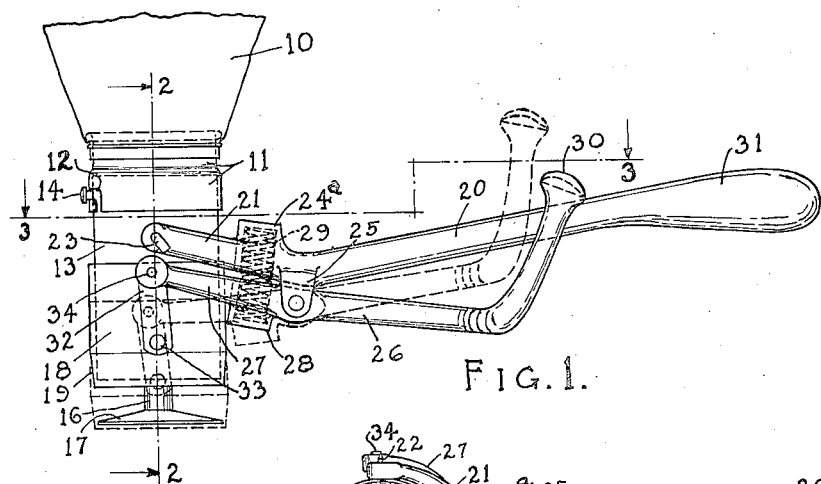
Fig. 1 is a side elevation of a device constructed in accordance with the present invention.
Figure 3:
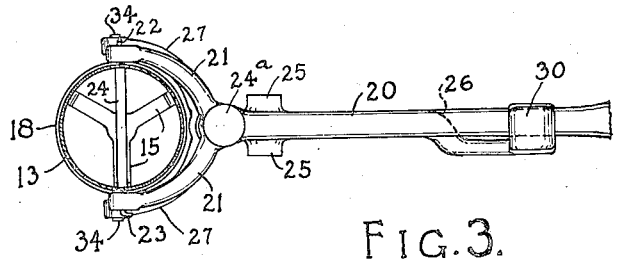
Fig. 3 is a horizontal section taken along line 3—3 of Fig. 1.
Figure 2:
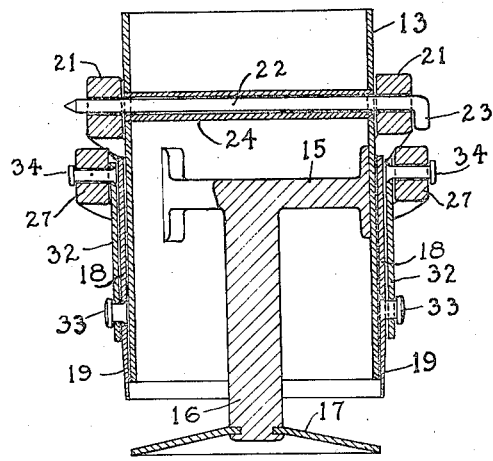
Fig. 2 is a vertical section therethrough taken along line 2—2 of Fig. 1.

While the present invention is of general application and use, it is particularly intended for the cutting and forming of doughnuts and to deliver the cut and formed dough masses directly to the cooking fluid. Heretofore, there have been automatic machines for the forming and cooking of doughnuts, which incorporated a cutter and former that delivered the formed dough masses directly to the cooking fluid but these machines have all been large and expensive apparatus for mass production and have not been suitable for limited production.

Also prior hereto there have been manually operable doughnut formers or cutters which have consisted of a flexible bag in which the dough supply was placed and from one end of which it is forced by pressure from the hand of the operator. At the discharge end of this bag is located the doughnut former into which the dough is forced from the bag and from which it is discharged in formed masses. The operation of this device is such that it must be supported by legs in an elevated position upon and over a surface and be manually operated by one hand of the operator while the other hand creates the pressure upon the bag. Each time a formed dough mass is placed upon the supporting surface the position of the former or cutter must be changed. After the dough masses have been formed and deposited on the supporting surface they must be manually transferred from the supporting surface to the cooking receptacle or fluid.

The present invention contemplates a device having a flexible bag with the former at one end thereof which may be supported and operated by one hand of the operator while the opposite hand of the operator creates the pressure on the bag or sack containing the dough supply whereby the dough within the sack may be forced into and through the former. In this manner the entire operation of the device may take place over the cooking receptacle so that the formed dough masses drop directly into the cooking fluid.

Reference being had more particularly to the drawing, 10 indicates a flexible bag in which the dough supply is placed. At its lower end this bag 10 is attached to a metal ring or collar 11 in which is formed a bayonet slot 12. This collar 11 is designed to be removably attached to the former so that the lower end of the bag 10 will discharge the dough directly into the former.

A main cylinder 13 having an outstanding pin 14 adjoining one end is so received within the collar 11 that the pin 14 thereof will be seated in the bayonet slot 12 thereby removably attaching the cylinder 13 to the collar 11 to form a continuation thereof.

A spider 15 is located within the cylinder 13 and carries a shaft 16 which is coincidental with the longitudinal axis of the cylinder. The lower end of this shaft 16 protrudes beyond the lower end of the cylinder 13 and carries a valve 17 of a diameter approximately equal to the exterior diameter of said cylinder. It will be manifest that the valve 17 is so positioned with reference to the end of the cylinder 13 that there is a space provided between the outer end of the cylinder 13 and the body of the valve 17. Thus, when pressure is exerted upon the sack or bag 10 by one hand of the operator the dough contained within the sack 10 is forced downwardly into and through the cylinder 13, and, when permitted, outwardly through the space between the end of the cylinder 13 and the valve 17.

A cylindrical cutter 18 is mounted for reciprocation upon the exterior of the cylinder 13 and has its lower edge beveled, as at 19, for coaction with the valve 17 to sever the dough mass discharged through the opening between the valve 17 and the cylinder 13 from the body of the dough within the cylinder 13. The diameter of this cutter 18 somewhat exceeds the diameter of the valve 17 so that at the lower end of the downward movement of the cutter 18 the valve 17 may be received therein. When the cutter 18 is elevated the space between the outer end of the cylinder 13 and the valve 17 is unobstructed so that a portion of the dough within the cylinder 13 may be forced outwardly through said space in a formed dough mass or ring. The lowering of the cutter 18 toward the valve 17 closes this space and the cutting edge 19 of the cutter 18 coacts with the periphery of the valve 17 to completely sever the mass so discharged from the mass of the dough within the cylinder 13 and close the space between the end of the cylinder 13 and the valve 17.

In order to operate the mechanism above described a supporting handle 20 is provided having its inner end forked to create the spaced arms 21 which embrace the upper end of the cylinder 13. The ends of these arms 21 are pierced by apertures through which a pin 22 passes to be mounted in aligned apertures or openings formed in the cylinder 13. One end of this pin 22 is angularly bent, as at 23, for the manipulation thereof and the body thereof contained within the cylinder 13 is encased by a cylindrical sheath 24. By removing the pin 22 from the aligned openings in the arms 21 and wall of the cylinder 13, the supporting handle 20 and its associated parts may be disengaged from the cylinder so that the cylinder 13 and the parts carried thereby may be removed from the cutter 18 thereby permitting the device to be thoroughly cleaned. Adjoining the juncture between the arms 21 and the body of the handle 20 is a socket 24, the function and utility of which will hereafter more fully described. Adjoining the socket 24 and projecting from the under side of the handle 20 is a pair of spaced studs 25.

For the movement of the cutter 18 relatively to the cylinder 13 and also relatively to the handle 20, a lever 26 is pivoted between the spaced studs 25. At its inner end this lever is bifurcated to create a pair of arms 27, similar to the arms 21, which embrace the upper end of the cutter 18. At the juncture of the arms 27 the lever 26 is provided with a socket 28 which is aligned with the socket 24 of the handle 20. An expansible coil spring 29 is mounted in these sockets 24—28 and tends to separate the bifurcated ends of the handle 20 and lever 26. As the arms 27 of the lever 26 are attached to the cutter 18, the operation of the spring 29 is such that the normal operation of the device is to force the arms 27 downwardly and to impart a similar movement to the cutter 18 so that the cutter encircles and embraces the valve 17 and closes the space between the outer end of the cylinder 13 and said valve.

In order to operate the cutter 18 against the action of the spring 29 so that it may be elevated at intervals to permit dough to be discharged through the space between the valve 17 and the ends of the cutter 18 and the cylinder 13, the outer end of the lever 26 is bent outwardly and upwardly to pass and extend above the body of the handle 20 at a point somewhat removed from the outer end of said handle to create a finger piece 30 positioned above and across the body of the handle 20. Thus, the extremity 31 of the handle 20 may be grasped by the hand of the operator with the thumb extending over and contacting with the finger piece 30. Pressure upon the finger piece 30 may move the outer end of the lever 26 downwardly until the finger piece contacts with the body of the handle 20 during which movement the arms 27 move upwardly toward the arms 21 thereby elevating the cutter 18 and unobstructing the space between the lower end of the cylinder 13 and the valve 17 to permit the discharge of dough through such space. This movement of the lever 26 is against the action of the spring 29. When pressure is removed from the finger piece 30, the spring 29 lowers the arms 27 and causes the outer end of the lever 26 to move upwardly until it contacts with the body of the handle 20, at which time the cutter 18 has moved downwardly and has again closed the space between the outer end of the cylinder 13 and the valve 17. It is manifest that the movement of the lever 26 is limited in one direction by the cooperation of the finger piece 30 and the body of the handle 20 and in the other direction by the coaction of the handle 20 and the body of the lever 26.

In order to connect the outer extremities of the arms 27 with the cutter 18 a toggle arm 32 is positioned against the outer surface of the cutter 18 upon each side thereof and at its lower end is pivoted, as at 33, to the cutter 18 adjoining the cutting edge 19 thereof. The upper end of each toggle arm 32 is pivoted, as at 34, to the outer end of one of the arms 27. In this manner the outer ends of the arms 27 are connected to the lower end of the cutter 18 in such manner that ample lost motion is provided for the relative movement of the several parts.

From the foregoing it is manifest that the handle 20 may be engaged at 31 by the hand of the operator with the thumb bearing upon the finger piece 30 while the other hand of the operator engages the upper end of the bag 10. When so held the discharge end of the former may be held over the cooking receptacle and pressure applied to the finger piece 30 to elevate the cutter 18 at which time pressure on the sack 10 causes dough to flow through the space between the valve 17 and the outer ends of the cutter 18 and cylinder 13. Immediately upon the release of the finger piece 30 the cutter 18 is lowered under the influence of the spring 29 severing the formed dough mass thus discharged and closing the space between the outer end of the cylinder 13 and the valve 17. The formed dough mass thus formed and severed drops directly into the cooking vessel and subsequent dough masses may be formed and released in the same manner.

It is apparent that the present device may be entirely supported in the hands of the operator and so manipulated that the formed dough masses will be discharged directly into the cooking receptacle thereby eliminating at least one operation and insuring a uniform product.

What is claimed is:—

1. The combination with a dough former, including relatively movable parts, of a handle having a pair of arms at one end thereof to embrace and be pivoted to one of said parts, of a lever pivoted to said handle having a pair of arms at one end thereof to embrace and be secured to another of said parts, and a finger piece on said lever coacting with and crossing said handle.

2. The combination with a dough former, including relatively movable parts, of a handle having a pair of arms at one end thereof to embrace and be pivoted to one of said parts, of a lever pivoted to said handle having a pair of arms at one end thereof to embrace and be secured to another of said parts, said lever and handle having aligned sockets, and a coil spring interposed between said lever and handle and seated in said sockets.

3. The combination with a dough former, having relatively movable parts, of a handle having a grip at one end and a pair of arms at the other to embrace and be pivoted to one of said parts, and a lever pivoted to said handle having one end bent laterally across said handle adjoining the grip thereof, and a pair of arms at the opposite end to embrace and be pivoted to another of said parts.

4. The combination with a dough former, having relatively movable parts, of a handle having a grip at one end and a pair of arms at the other to span and be removably pivoted to one of said parts, a lever pivoted to said handle having a finger piece at one end and a pair of arms at the other to span and be pivoted to another of said parts, and a spring interposed between said lever and said handle adjoining said arms.

CHARLES A. KIRWIN.